Dec. 11, 1951 A. M. YOUNG Re. 23,439

ELECTRIC TOASTER

Original Filed Dec. 13, 1948 2 SHEETS--SHEET 1

Inventor:
Allan M. Young, by Kurd mlebergs
His Attorney.

ELECTRIC TOASTER

Original Filed Dec. 13, 1948 2 SHEETS—SHEET 2

Inventor:
Allan M. Young,
by Sherrid and Biggs
His Attorney.

Reissued Dec. 11, 1951 Re. 23,439

UNITED STATES PATENT OFFICE 23,439

ELECTRIC TOASTER

Allan M. Young, Meriden, Conn., assignor to General Electric Company, a corporation of New York Original No. 2,545,404, dated March 13, 1951, Serial No. 65,048, December 13, 1948. Application for reissue October 13, 1951, Serial No. 251,230

1 Claim. (Cl. 219—19)

Matter enclosed in heavy brackets [ ] appears in the original patent but forms no part of this reissue specification; matter printed in italics indicates the additions made by reissue.

This invention relates to electric toasters, and particularly to an improved heating unit assembly therefor.

The invention is particularly advantageous in toasters of the type having a toasting chamber provided with movable slice holders on which the bread slices are placed. Heating elements are fixed within the chamber on each side of the slice holder, and when the slice holder and bread slice are in toasting position within the chamber the slice is confronted on each side by a heating element. A heating unit may burn out, or it may be damaged and require replacement. Damage may occur, for example, when a bread slice jams within the toasting chamber and the user probes into the chamber with a fork or knife in an attempt to free the slice.

The present invention provides means to facilitate the removal and replacement of the heating elements; and it is therefore a principal object of the present invention to provide an improved toaster in which the heating unit may be removed and replaced without disassembly or removal of any major structural or operative part.

It is another object of the invention to provide a heating unit for an electric toaster which may be removed and replaced through the bottom of the toasting chamber and is immediately accessible upon removal of the crumb tray at the bottom of the unit.

Figure 1:
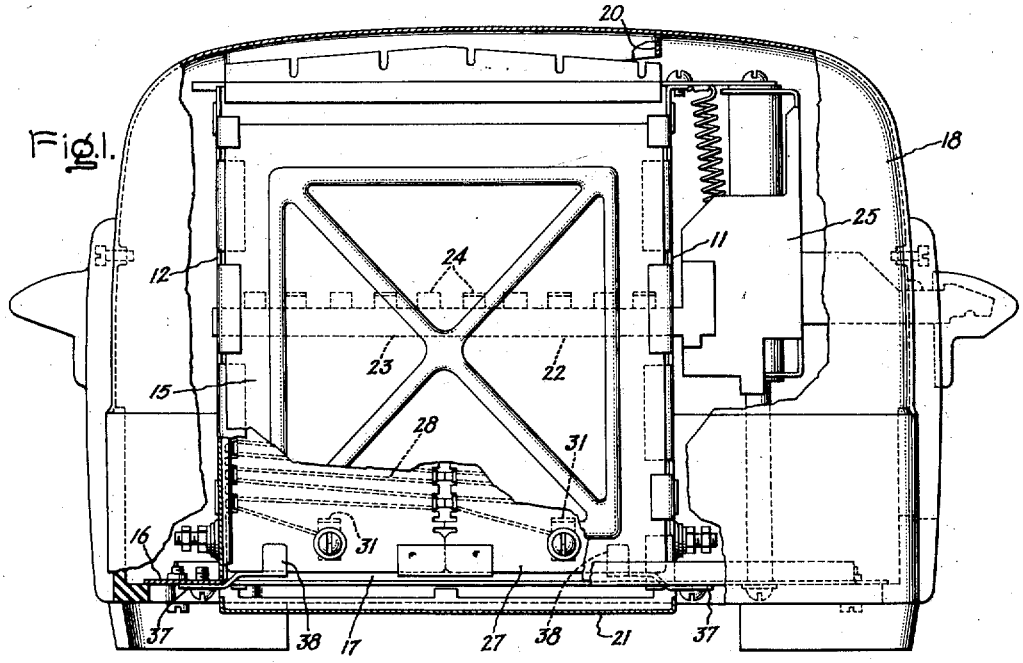
Figure 2:
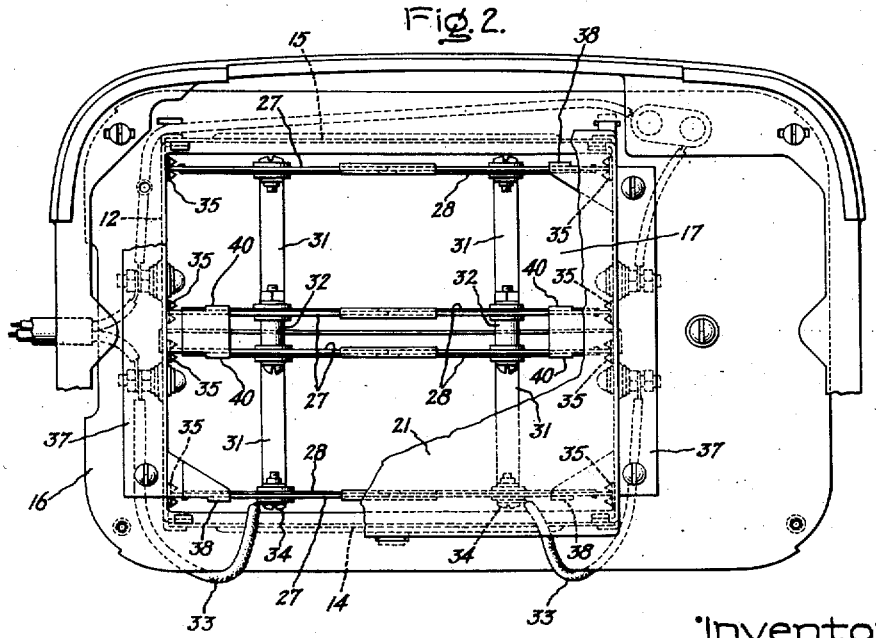

In the accompanying drawings, Fig. 1 is a side elevation, partly in section, showing the application of the invention to a conventional automatic electric toaster. Fig. 2 is a bottom plan view with certain of the parts being broken away to reveal underlying structure, and Fig. 3 is an elevation, in section, of the toaster placed bottom-up and showing in "exploded" relationship the heating element and a securement clamp therefor.

As appears in Fig. 1, an electric toaster includes a structure having end walls 11, 12, side walls 14, 15 and a base or bottom wall 16, said structure providing a toasting chamber 17. A decorative outer casing 18 is suitably secured relative to the respective walls of the structure to envelop the same in spaced relationship with the walls thereof, and has an upper wall provided with slots 20 through which bread slices may be introduced into the toasting chamber. The bottom of the chamber is entirely open, and is normally closed by a hinged crumb tray 21. In a toaster of the automatic type such as illustrated in Fig. 1 the bread slices are placed on slice holders, usually two in number, which are guided for vertical movement within the chamber in alignment with the slots 20. A typical slice holder 22 has a bottom rib 23 from which base-providing ears 24 extend. The rib 23 passes through guide slots in the end walls of the chamber frame. Conventional timing means 25 return the slice holders from a lowered position to the Fig. 1 position after toasting has been completed, as is well understood. The timing means and their association with the slice holders 22 form no part of the present invention.

Figure 3:
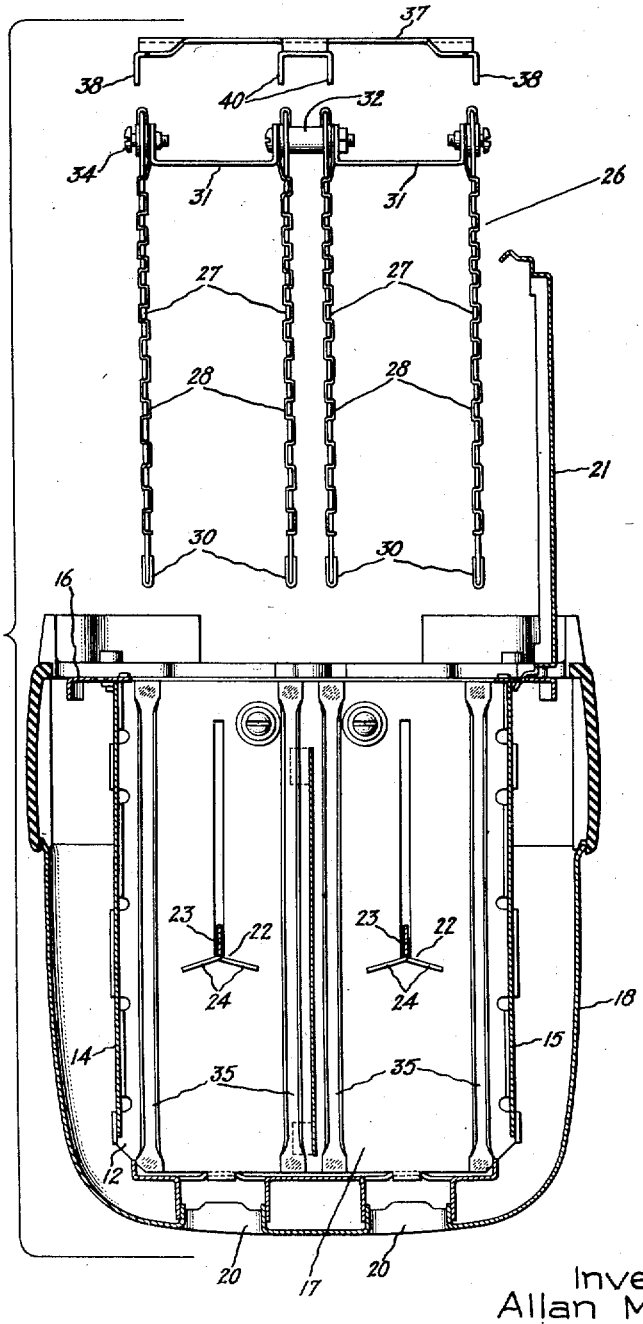

As most clearly appears in Fig. 3 the electric heating unit 26 comprises a plurality of plates 27 of sheet insulation material such as mica, on which are wound strips or wires of resistance material 28. The insulation plates may be stiffened at the upper edges by crowns 30 of thin metal. The plates are arranged in pairs, one pair for each slice holder, and the plates of each pair are maintained in spaced relationship by means such as spacer bars 31, which serve also as bus bars interconnecting the heat coil windings. A sleeve or equivalent 32 separates the respective pairs. It will be noted that the several spacing elements are at the bottom of the heating unit, and space the plates so that they provide adequate clearance on each side of the slice holders when the heating unit is in home position. The heat coils are electrically connected, usually in parallel, by means including leads 33 affixed to binding screws 34 on one of the plates. The leads 33 have slack to permit the heating unit to be drawn outwardly from the base sufficiently to permit the use of a screw driver to disconnect the heating unit from the leads for complete removal. As previously noted, the bottom of chamber 17 is entirely open, and because the transverse elements or spacers associated with the heating unit 26 are at the base thereof, there is nothing to interfere with the insertion of the heating element into the chamber through the rear thereof.

To guide the insertion of the heating unit and to properly position the respective heating elements at the side of the slice holders I provide shallow channels 35 suitably secured in proper alignment at the respective end walls of the chamber. Said channels slidably engage the side edges of the insulation plate, and have open mouths to receive the end edges of the insulation plates 27 as they enter the chamber 17 from the bottom thereof. It is preferred to have four channels for each heating element pair, so that the end edges of each insulation plate will be supported within the chamber. Such construction insures complete stability within the chamber. Obviously, however, less than that number of channels may be employed if desired. To support the heating unit within the toasting chamber when the toaster is again placed on its base after the heating unit has been inserted, I provide brackets 37 which extend transversely across the chamber opening at the ends thereof. Said brackets are removably secured to the bottom wall 16, preferably with screw fastening as illustrated. As appears in Figs. 1 and 3 the brackets have offset side walls 38 and intermediate walls 40 which lie along sides of the insulator plates. These walls engage with the insulator plates to additionally stabilize the plates within the chamber.

It will now be apparent that to remove a heating unit it is necessary only to swing open the crumb tray 21 until the bottom of the chamber is completely exposed and then to remove the brackets 37. The heating unit may be grasped by the spacer bars 31 and drawn outwardly until the electrical connection screws 34 are accessible. The leads 33 may then be disconnected and the heating unit entirely withdrawn. Replacement of the new unit is merely a matter of threading the end edges of the insulation plates into the guide channels 35 and lowering the heating unit until the leads 33 can be reconnected to the screws 34, whereupon the unit is inserted fully into the chamber, the brackets 37 reapplied and the crumb tray 21 returned to closed position. There is no conflict with the slice holders 22, nor is there need to remove or disassemble any major structural part.

What I claim as new and desire to secure by Letters Patent of the United States is:

An electric toaster comprising a housing having wall members arranged to provide an open bottom toaster chamber, channel means arranged in aligned mutually facing relationship on opposed walls of said chamber and extending to the bottom thereof, a heating unit including plates of insulation material the side edges of which are slidably carried by said channel means, said plates of insulation material having wound thereon a resistance wire element, said heating unit plates being insertable into said channel means through the bottom opening of said chamber, bracket means removably affixed to certain of said wall members adjacent the bottom opening of said chamber externally of the boundaries thereof, said bracket means projecting into said chamber and in engagement with side wall and bottom edge portions of said insulation plates to support the same within said chamber, means independent of said bracket means for connecting said heating unit to a source of electrical energy, and a crumb tray [hingedly] mounted below said chamber to provide a removable bottom closure therefor.

ALLAN M. YOUNG.

REFERENCES CITED

The following references are of record in the file of this patent or the original patent:

UNITED STATES PATENTS

| Number | Name | Date |
|---|---|---|
| 1,102,393 | Denhard | July 7, 1914 |
| 1,319,533 | Rice | Oct. 21, 1919 |
| 1,533,241 | Forshee | Apr. 14, 1925 |
| 1,900,249 | Miller et al. | Mar. 7, 1933 |
| 2,012,788 | Ireland | Aug. 27, 1935 |
| 2,024,386 | Phelps | Dec. 17, 1935 |
| 2,046,471 | Lavenburg | July 7, 1936 |
| 2,194,848 | Collins | Mar. 26, 1940 |
| 2,224,483 | Merrill | Dec. 10, 1940 |
| 2,357,288 | Ricard | Sept. 5, 1944 |
| 2,414,082 | Barclay | Jan. 14, 1947 |